Figure 1:
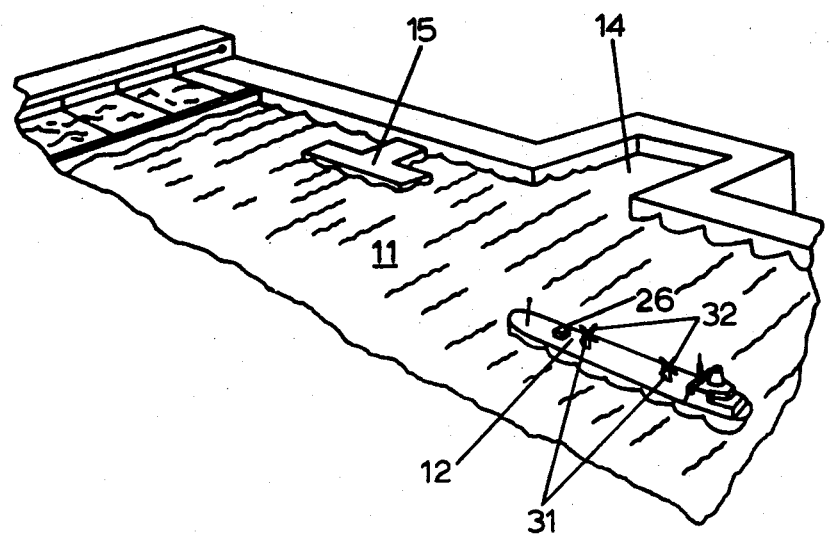

United States Patent [19]

Crago et al.

[11] 3,871,113

[45] Mar. 18, 1975

[54] NAVIGATION TRAINING SIMULATORS

[75] Inventors: William Arthur Crago; Derek Martin Emmerson, both of Isle of Wight, England

[73] Assignee: British Hovercraft Corporation Limited, Yeovil, Somerset, England

[22] Filed: June 6, 1973

[21] Appl. No.: 367,418

[30] Foreign Application Priority Data
June 7, 1972 United Kingdom............ 26532/72
Aug. 14, 1972 United Kingdom............ 37784/72

[52] U.S. Cl................. 35/10.2, 35/12 L, 35/12 N, 353/13
[51] Int. Cl. ............................................ G09b 9/08
[58] Field of Search ................ 35/10.2, 12 L, 12 N; 353/11, 12, 13; 178/DIG. 35, DIG. 20; 235/61.5 R, 61.5 T

[56] References Cited
UNITED STATES PATENTS

| | | | |
|---|---|---|---|
| 3,039,204 | 6/1962 | Bryan et al. | 35/10.2 |
| 3,205,303 | 9/1965 | Bradley | 178/DIG. 20 |
| 3,422,207 | 1/1969 | Flower et al. | 35/12 N |
| 3,534,486 | 10/1970 | Frasca et al. | 35/10.2 |
| 3,560,644 | 2/1971 | Petrocelli et al. | 178/DIG. 35 |
| 3,670,426 | 6/1972 | Horowitz | 35/10.2 |

*Primary Examiner*—Malcolm A. Morrison
*Assistant Examiner*—Errol A. Krass
*Attorney, Agent, or Firm*—Larson, Taylor & Hinds

[57] ABSTRACT

A navigation training simulator in which a model, representing a full scale vehicle, operates in a medium representing that in which the full scale vehicle operates, and a student remotely controls the model from a control station representing the control station of the full scale vehicle. A visual representation of navigational objects external to the model is presented to the student at the control station as they would appear to him if he were at the control station on the model.

Means may be provided to permit an instructor to apply to the model forces representing wind, tide and other natural forces experienced by the full scale vehicle.

9 Claims, 10 Drawing Figures

NAVIGATION TRAINING SIMULATORS

This invention concerns navigation training simulators, and is more particularly, but not exclusively, concerned with providing a simulator to train a ship's master in the manoeuvring of a vessel alongside a quay or in a restricted area.

In a navigation training simulator which includes a dynamic model, operated and controlled by a student from a control station remote from the model, it is difficult for a student to visualise the appearance of objects external to the model as they would appear from a control station on the model. This gives rise to difficulties in controlling the model, particularly in confined spaces.

It is an object of this invention to provide the student with representative means of control and a visual reference similar to that which he would have if he was on the bridge of the dynamic model.

When a ship is manoeuvring in coastal waters or in the vicinity of docks, jetties and the like, the master must allow for winds, tides and similar natural phenomena in his control of the ship. These natural phenomena produces forces on the ship which can be added algebraically and represented as a unitary force acting on a hull of the ship.

This unitary force produces movement of the hull dependent upon the direction from the which it acts and the part of the hull upon which it acts.

For example, a unitary force acting on a side of the hull through the centre of lateral resistance of the hull will tend to move the hull sideways. If, however, the force acts on the side of the hull either ahead of or abaft the centre of lateral resistance, the force will tend to change the heading of the hull as well as to move it sideways. Again, a force acting from ahead or astern of the hull will decrease or increase, respectively, the speed of the hull, and a force acting through vectors between the examples quoted will produce combinations of the movements described.

To simulate independently, conditions representative of wind, currents and the like on the dynamic model of a navigation training simulator, which model comprises a shipt, operating ship, a manoeuvring basin, considerable adaption of the manoeuvring basin is necessary. This results in a complicated and expensive installation which cannot easily be moved from one place to another.

It is a further object of the invention to provide the ability to remotely introduce to the model conditions simulating wind, currents and the like when the model is operating in a model basin, which may be any convenient location such as a swimming pool, test tank or pond.

According to the invention we provide a navigation training simulator comprising a dynamic model representative of a full scale vehicle, a control station separate from the model and representative of the control station of the full scale vehicle, means on the vehicle responsive to inputs from the control station for moving and controlling the model when it operates in an environment representative of the environment in which the full scale vehicle operates, means on the model for viewing and transmitting to the control station the visual appearance of objects external thereto and means at the control station for visual display of the transmission from the model.

Preferably the viewing means on the model is responsive to the action of an operator at the control station in scanning to either side of straight ahead relative to the model, so that this view is represented at the control station.

The viewing means on the model may comprise one or more television cameras situated on the model, viewing objects external to the model and transmitting a representation of the view to a television receiver or screens at the control station. It is a feature of the invention that the television receiver or screens are arranged at a distance from the operator so that the angle at the eye of the operator made by lines from the edges of the received representation is substantially the same as the angle of view of the camera or cameras.

The model may have situated thereon means to apply forces to the model so as to produce a resultant force which represents a resultant force of natural forces external to and acting on the full scale vehicle.

In one embodiment of the invention the dynamic model is a radio controlled model ship operating in a manoeuvring basin and the control station is a representation of part of the bridge of a ship.

A force produced within the hull of the model to represent a resultant of the sum of forces produced by the forces of wind and the like on the hull of a full scale ship represented by the model may be produced by a plurality of air propellers mounted on pylons, pivotable in azimuth, and situated on the longitudinal centre line of the model. The direction and size of the forces produced by the propellers may be remotely controlled and/or locally programmed. Alternatively, the force applied to the model may be the sum of forces generated wholly or in part by underwater force generators.

Figure 2:
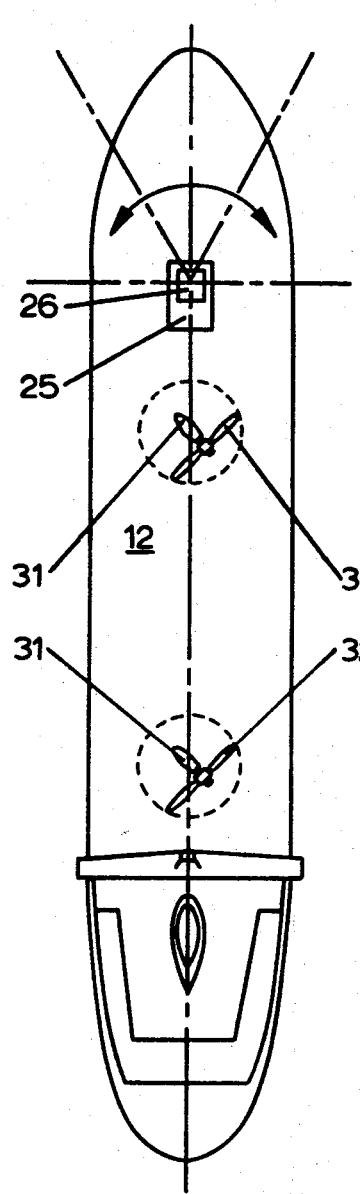
Figure 3:
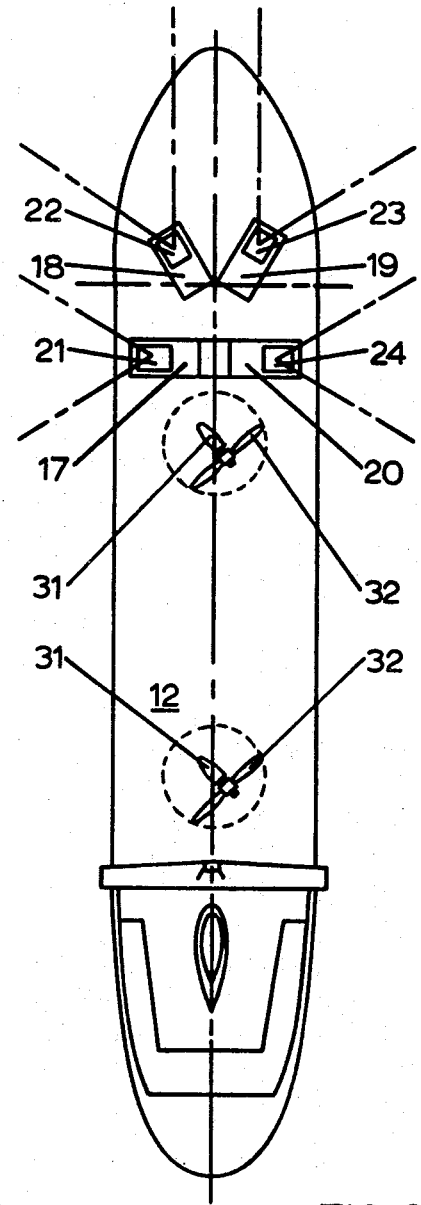
Figure 4:
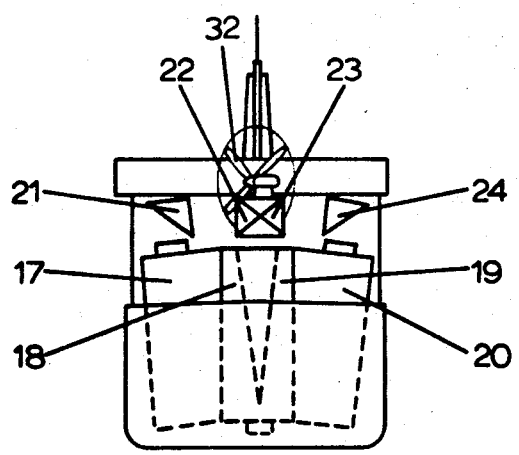
Figure 5:
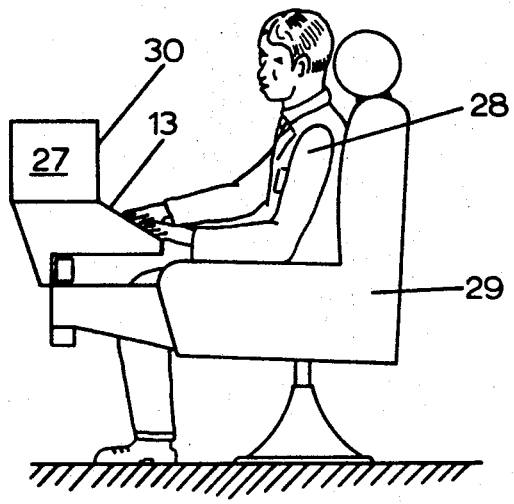
Figure 6:
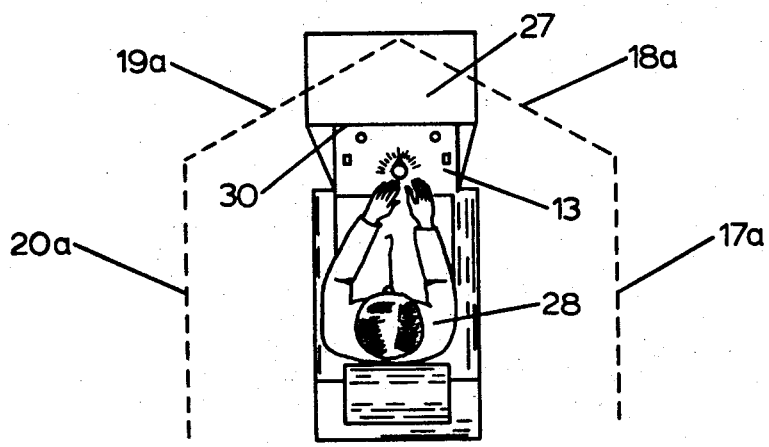
Figure 7:
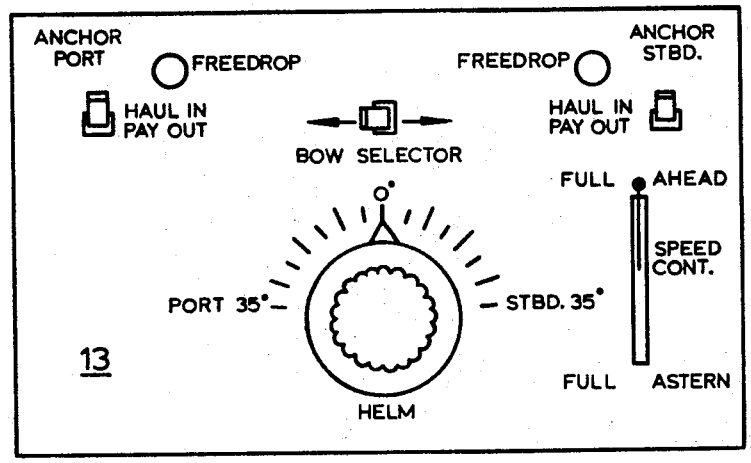
Figure 8:
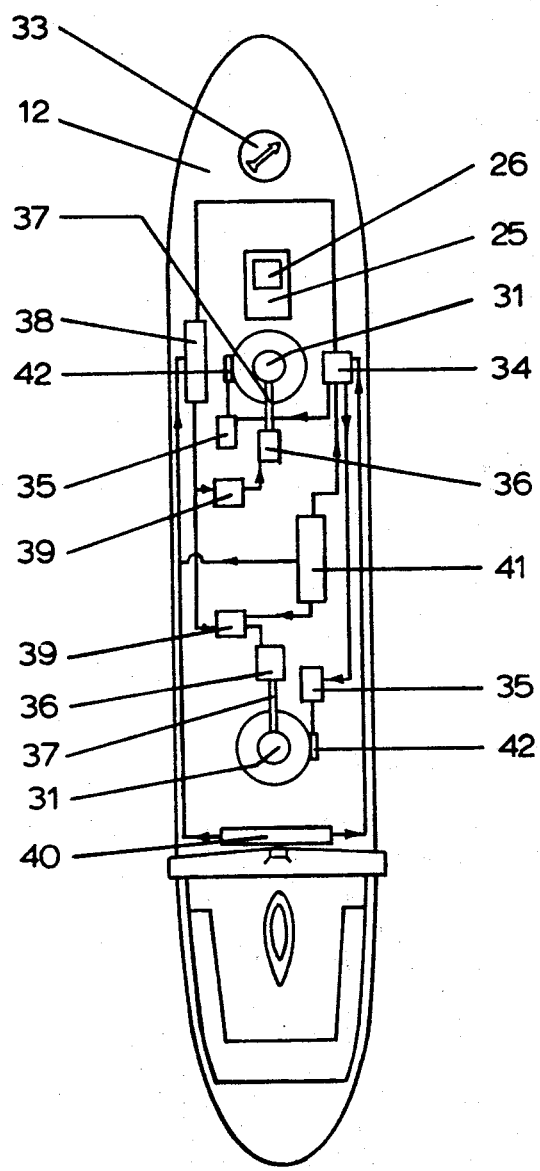
Figure 9:
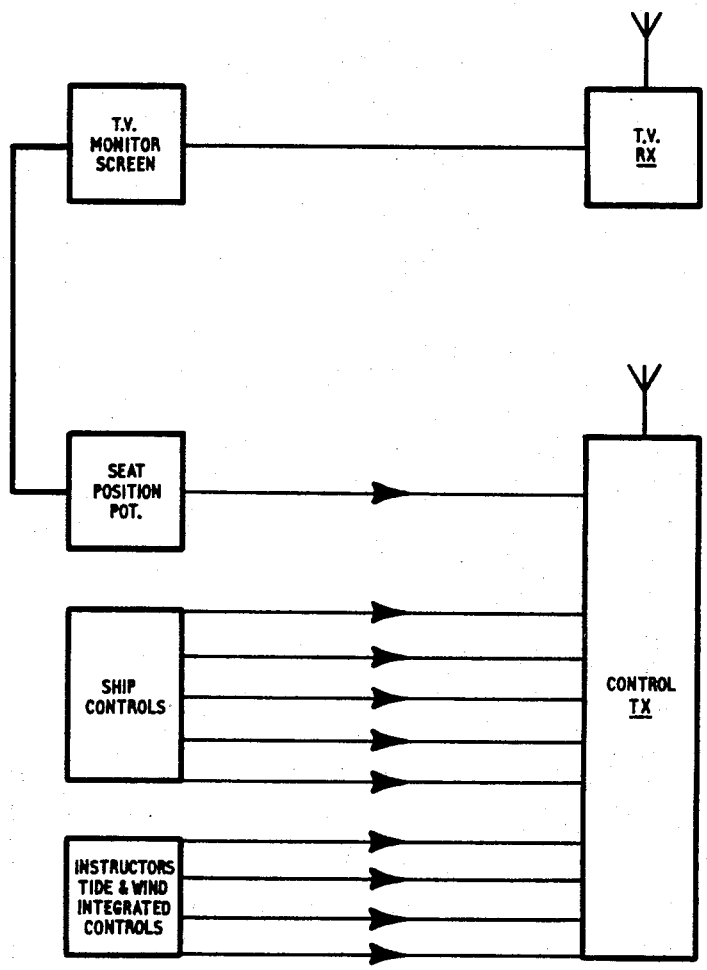
Figure 10:
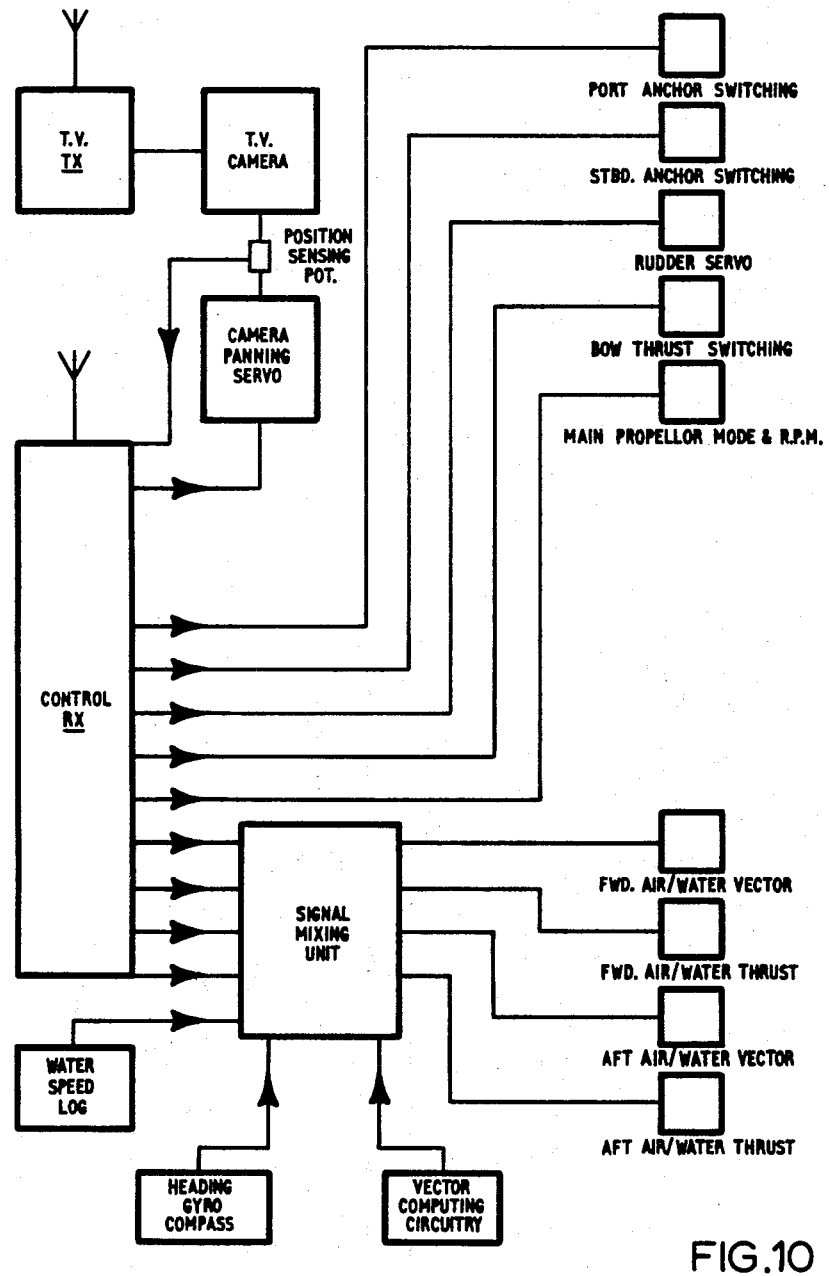

Various embodiments of the invention will now be described, by way of example only, with reference to the accompanying drawings, in which:

FIG. 1 is a perspective view of part of a manoeuvring basin with a radio controlled model ship according to the invention therein, FIG. 2 is a diagrammatic plan of a model ship illustrating the preferred embodiment having a single pivotal television camera, and two pivotal propellers, FIG. 3 is a diagrammatic plan of a model ship illustrating an alternative embodiment having a plurality of television cameras and two pivotable air propellers, FIG. 4 is a diagrammatic view of a model ship, looking from ahead, illustrating the arrangement of the television cameras shown in FIG. 3, FIG. 5 is a side elevation of a student sitting at the control station, FIG. 6 is a plan of the control station, showing screens for the alternative embodiment in broken lines, FIG. 7 is a control panel operable by a student to control the model ship, FIG. 8 is a block diagram of the force vector system, FIG. 9 is a block diagram of the stationary part of the simulator control system, and FIG. 10 is a block diagram of the moving model part of the simulator control system.

FIG. 1 shows part of a manoeuvring basin 11 with a dynamic model represented by a radio controlled model tanker 12 floating therein. The model tanker 12 is powered by electrical storage batteries stowed within its hull, and is preferably linked by radio to a control panel 13 (FIG. 7) which represents part of the bridge of a full scale tanker to provide the control functions of propeller speed, helm, bow thrust and anchor operation.

A diagrammatical representation of the radio contol functions for operation the model is shown in FIGS. 9 and 10.

In the preferred embodiment of the invention the model tanker 12 has a television camera 25 mounted in the hull. For convenience of installation the field of view of the camera is directed through a prism 26.

The television camera 25 and the prism 26 are pivotally mounted so that they are turned in azimuth as a single unit by an electric motor powered by the batteries of the model 12 and controlled by a student 28 seated in a swivelling chair 29 by way of a radio link.

The television camera 25, for example a Philips Mini Compact camera, Type LDH 0050, feeds a low powered transmitter which transmits signals to a receiver unit, for example a Decca Off-Air Colour Receiver Unit RN.3911, remote from the manoeuvring basin 11. The receiver unit feeds video signals into a monitor 27 which presents the view seen by the television camera 25 to a student 28 seated in a swivelling chair 29 on a screen 30. Both the monitor 27 and the control panel 13 are mounted on the swivelling chair 29 so that as the student 28 turns the chair 29 the control panel 13 and the screen 30 are always in front of him.

The position of the monitor 27 on the swivelling chair 29 is such that the angle at the eyes of the student seated in the chair formed by lines joining the edges of the screen 30 to the eyes is substantially equal to angle of view of the camera 25 in combination with the prism 26.

A position sensitive potentiometer in the base of the swivelling chair 29 senses swivelling movement of the chair 29 by the student and generates a radio signal to cause a corresponding azimuthal movement of the television camera 25 and its prism 26 in the hull of the model 12.

In operation, the chair 29, the control panel 13 and the monitor 27 are situated in a room remote from the manoeuvring basin 11, and the student 28 has a view on the screen 30 of the basin 11, the dock 14, the jetty 15 and navigational aids or hazards as if he was on the bridge of the model tanker 12. When the chair is central the view shown on the screen is that which is straight ahead of the model and which will change as the model turns. If, however, the student wishes to see what is to one or the other of the sides of the model he swivels his chair in the desired direction, the camera 25 and prism 26 follow the movement of the chair, and the required view is shown on the screen 30.

FIGS. 3 and 4 illustrate another embodiment of the invention in which a plurality of fixed television cameras 17, 18, 19 and 20 each with its respective prism 21, 22, 23 and 24 take the place on the model 12 of the pivotal camera 25 and prism 26. At the control station the monitor 27 and screen 30 are replaced by fixed screens 17a, 18a, 19a and 20a (FIG. 6). Views from the cameras 17, 18, 19 and 20 are permanently projected onto the corresponding screens 17a, 18a, 19a and 20a, and only change as the heading of the model 12 changes. Again, the screens 17a, 18a, 19a and 20a are arranged so that the angle of lines from their edges at the eyes of the student 28 is substantially the same as the angle of view of the corresponding camera 17, 18, 19 and 20.

In this embodiment, when the student wishes to see to either side of the model he merely swivels the chair or turns his head.

In one arrangement the control panel 13 is stationary, as it would be on the bridge of a full scale ship, leaving the chair and, in the case of the preferred embodiment, the monitor 27 and screen 30 to swivel.

Additionally to any of the embodiments, radio controlled pylons 31, pivotal in azimuth, which carry air propellers 32 situated on the longitudinal centre line of the model 12 and spaced apart so that one is ahead of and one is abaft the centre of lateral resistance of the model, act as force generating means. The pylons 31 are turned in azimuth by electric motors 35 (FIG. 8) by way of suitable gearing 42. The azimuth electric motors 35 are powered by batteries carried by the model 12 and controlled by an input from an instructor by way of a radio link and an input from a terrestial reference, for example, a compass 33.

A suitable radio link is provided by a model control system manufactured by Flight Link Control Limited. In describing the application of the forces to the model so as to produce a force which represents the resultant force of natural forces external to and acting on the full scale tanker only wind forces are taken into account. Forces representing tides, currents, waves and the like can be similarly represented and added algebraically to that representing the wind.

The input of the instructor governs the direction of the force representing the direction of the wind force relative to the water. The compass 33 keeps the force in this direction irrespective of the heading of the model 12. Signals from the instructor and from the compass 33 are combined electronically in a direction control unit 34 to generate a control signal to the pylon azimuth electric motors 35.

The air propellers 32 are driven by electric motors 36 through suitable transmission means 37. The power output of the propellers 32 is controlled, through an electronic power control unit 38 and the radio link 41, by the instructor to represent the strength of the wind. The control power unit 38 also senses the direction of the wind in relation to the hull of the tanker 12 and controls the power in proportion to the wind resistance of the hull.

When it is desired to represent the wind applying a turning force to the hull the power output required of each propeller 32 is different. This differential is controlled by the instructor by way of the radio link 41 and the propeller power differential controls 39.

The size and direction of a wind force acting upon a ship is the resultant of the wind speed and its direction and of the speed of the ship and its direction. Therefore, a speed detector unit 40 feeds the speed of the model 12 into both the pylon direction control unit 34 and the propeller power control unit 38, so that their outputs are scaled appropriately to give a resultant force representing the wind.

Representation of wind speed and model speed may be appropriately scaled to the scale between the model tanker and the full scale tanker.

FIGS. 9 and 10 are block diagrams of the complete control system of the training simulator illustrating the transmitting and receiving links between the stationary control stations and the moving model.

Various modifications are possible within the scope of the appended claims. In particular, the radio links may be replaced by insulated electrical cables, and in general the training simulator could be used for vehicles other than ships.

We claim as our invention:

1. A ship navigation training simulator comprising a dynamic model representative of a full scale ship and comprising a radio controlled model ship, a control station separated from said model and representative of a portion of the bridge of the full scale ship, means on the model responsive to inputs from the control station for moving and controlling the model when the model operates in an environment representative of the environment in which the full scale ship operates, means on the model for viewing and transmitting to the control station the visual appearance of objects external thereto, and means at the control station for visual display of the transmission from the model, said viewing means on the model comprising a pivotally mounted television camera responsive to the action of an operator at the control station in scanning to either side of straight ahead relative to the model so that this view is represented at the control station, said simulator further comprising means, responsive to the swivelling movement of a chair for a student at the control station, for generating a signal which causes corresponding movement of the television camera.

2. A navigation training simulator as claimed in claim 1, wherein the television camera views objects exterior to the model through a prism mounted on the camera.

3. A navigation training simulator as claimed in claim 1, wherein a monitor and screen are positioned on the swivelling chair such that the angle at the eyes of a student of a given height seated in the chair formed by lines joining the edges of the screen is substantially equal to the angle of view of the camera.

4. A navigation training simulator as claimed in claim 1, wherein the model has situated thereon means to apply forces to the model so as to produce a resultant force which represents a resultant force of natural forces external to and acting on the full scale vehicle.

5. A navigation training simulator as claimed in claim 4, wherein the means for applying forces to the model comprise air propellers.

6. A navigation training simulator as claimed in claim 4, wherein two air propellers pivotal in azimuth are situated on the longitudinal centre line of the model and are spaced apart so that one is ahead and one is abaft the centre of lateral resistance of the model.

7. A navigation training simulator as claimed in claim 4, wherein the means for applying forces to the model comprise underwater force generators.

8. A navigation training simulator as claimed in claim 4, wherein the means for generating the forces on the model is remotely controlled.

9. A navigation training simulator as claimed in claim 8, wherein the means for generating the forces on the model is additionally controlled by an input from a terrestial reference.

* * * * *